United States Patent Office 3,703,504
Patented Nov. 21, 1972

3,703,504
PROCESS FOR PRODUCING SULFURIZED OLEFINS
Andrew G. Horodysky, Beaumont, Tex., assignor to Mobil Oil Corporation
No Drawing. Filed Jan. 12, 1970, Ser. No. 2,349
Int. Cl. C07c 161/00
U.S. Cl. 260—139                                14 Claims

ABSTRACT OF THE DISCLOSURE

Olefins (e.g., isobutylene) are reacted with sulfur monochloride in the presence of a catalytic amount of methanol to form a sulfochlorinated intermediate product which is then reacted in the presence of a relatively large amount of isopropanol with an aqueous solution of sodium monosulfide derived from spent caustic soda liquors of petroleum refinery origin in producing a noncorrosive sulfurized organic product of unusually high sulfur content. The sulfurizing and dechlorinating reactant for the second stage of the process is prepared from the spent effluents (sulfurized aqueous sodium hydroxide solutions) from various hydrocarbon purification operations by preliminary treatment with hydrogen sulfide for separation of organic components and predominant or full conversion of the sodium compounds to sodium hydrosulfide followed by the addition of sodium hydroxide to the hydrosulfide solution to produce the sodium monosulfide reactant.

BACKGROUND OF THE INVENTION

Field of the invention

This invention relates to processes for the use of by-products of low commercial value in the production of organic sulfide compounds, including products having improved characteristics.

Prior art

Various proposals have been made for producing organic sulfides by treating olefins with sulfur chlorides and then reacting the resulting intermediate with compounds containing sulfur. For example, organic polysulfides may be prepared by the sulfochlorination of olefins containing 6 or more carbon atoms and further treatment with inorganic higher polysulfides according to Eby Patent No. 2,708,199. In addition, Myers Patent No. 3,471,404 discloses that sulfurization reactions of this nature may be carried out by reacting a sulfochlorinated isobutylene intermediate product with a mixture of an alkali metal sulfide and free sulfur in a molar ratio of at least 2:1 followed by a further prolonged treatment with aqueous sodium hydroxide, apparently for reducing high chlorine contents, in producing extreme pressure additives. Beretvas et al. Patent No. 3,068,218 indicates that sulfochlorinated products of improved color may be obtained by sulfochlorinating polymers of propylene, etc. containing 8 or more carbon atoms in an aqueous reaction mixture and then sulfurizing the intermediate with a solution of sodium sulfide in water and isopropanol in producing products with sulfur contents of the order of 10 to 34% by weight. In Kimball Patent No. 2,249,312, the sulfochlorinated adduct of amylene or higher olefins is treated with sodium sulfide and/or other alkaline compounds to produce stable products of relatively low sulfur content and generally high chlorine contents.

In general, prior art organic sulfide compounds have one or more of such undesirable characteristics as high cost, low sulfur content and corrosive attack on metals and alloys used in machinery. Products having a chlorine content above 2% and also those produced from sodium polysulfide reactants are usually rather corrosive.

SUMMARY OF THE INVENTION

The present invention relates to a process which comprises sulfohalogenating an olefin with a sulfur halide in the presence of a catalytic quantity of a lower aliphatic alcohol to form a sulfohalogenated organic intermediate, and thereafter sulfurizing and dehalogenating said intermediate in the presence of a substantial quantity of a lower aliphatic alcohol by treatment with an aqueous alkali metal monosulfide solution derived from a spent aqueous alkali metal hydroxide effluent from hydrocarbon purification and having a substantial combined sulfur content in producing an organic sulfide of high combined sulfur content.

Other aspects of the invention are concerned with preferred reactants and catalysts and preparation of the alkali metal monosulfide solution as well as preferred reaction conditions.

DESCRIPTION OF SPECIFIC EMBODIMENTS

In the formation of organic sulfides according to the present invention, a number of important and unexpected advantages or benefits are obtained. With particular reference to their utility as extreme pressure additives for lubricating oils and greases, the products obtainable in the instant process exhibit not only a highly desirable golden color in most instances and complete miscibility in oils and greases, but they also have a very high sulfur content of more than about 44% by weight (typically about 46 and 48% combined sulfur and devoid of free sulfur) which accounts for their attaining the highest possible ratings of 460+ pounds in the SAE Load Carrying Test at 1,000 r.p.m. with 4.4% of additive in the lubricant. Also they typically have chlorine contents of the order of 0.2% or less and excellent ASTM No. D130–56 copper strip corrosion test ratings of 1B after 6 hours at 212° F. using a 3% additive concentration. Much faster reaction rates are obtainable in the sulfurization-dechlorination step of the instant process, and that reaction is carried farther toward completion with an increase in yield as evidenced by the low chlorine content of the product which permits the customary caustic alkali wash treatment to be omitted with consequent further economy in the process. Such omission is particularly desirable inasmuch as a caustic wash has the undesirable effect of typically reducing the sulfur content of the product by about 2%. Since much shorter reaction times are possible with the higher reaction rates and no significant increase in the rate of polymerization of the sulfurized product liquid has been observed, products of unusually low viscosity may now be obtained, and the lower viscosity facilitates both handling and blending as well as reducing the pour point.

It is surprising to obtain such improved results along with the economic advantage of using a charge that includes an alkali metal sulfide reactant derived from available and cheap refinery by-product streams from various hydrocarbon purification operations. In view of the increasing demand for petroleum products of low sulfur content, a typical oil refinery produces large amounts of spent aqueous caustic soda solutions contaminated with hydrogen sulfide and other sulfur compounds, such as mercaptans or mercaptides, and/or phenolic and thiophenolic compounds.

A wide variety of olefinic substances may be charged to the initial or sulfochlorination reaction including hydrocarbon olefin having a single double bond with terminal or internal double bonds and containing from about 2 to 8 or more carbon atoms per molecule in either straight, branched chain or cyclic compounds, and these may be exemplified by ethylene, propylene, butene-1, cis and trans butene-2, isobutylene, diisobutylene, triisobutylene, the pentenes, cyclopentene, he hexences, cyclohexene, the octenes, decene-1, etc. In general, $C_{3-6}$ olefins or mixtures thereof are desirable for preparing sulfurized products for use as extreme pressure additives as the combined sulfur content of the product decreases with increasing carbon content yet its miscibility with oil in lower for propylene and ethylene derivatives.

In some embodiments of the invention, isobutylene is particularly preferred as the sole olefinic reactant, but it may be employed, desirably in major proportion, in mixtures containing one or more other olefins; moreover, the charge may contain substantial proportions of saturated aliphatic hydrocarbons as exemplified by methane, ethane, propane, butanes, pentanes, etc. Such alkanes are preferably present in minor proportion in most instances to avoid unnecessary dilution of the reaction, since they neither react nor remain in the products but are expelled in the off-gases or by subsequent distillation. However, mixed charges can substantially improve the economics of the present process since such streams are of lower value than a stream of relatively pure isobutylene.

Volatile olefins are often readily available in liquid form, and it is usually desirable to charge olefinic liquids which are vaporized by the heat of reaction, as such evaporation provides a substantial cooling effect that permits the flow of water for cooling the reactor to be reduced considerably for greater economy. Also there are indications that the use of a volatile liquid olefin reactant has the unexpected and desirable effect of lowering the viscosity of the final product.

The other reactant in the first stage is preferably sulfur monochloride ($S_2Cl_2$); but other similar compounds such as sulfur dichloride and $S_3Cl_2$ as well as the corresponding but more expensive sulfur bromides may be employed in an amount which will provide a quantity of sulfur corresponding to desirable reactant ratios for sulfur monohalide. The molar ratio of olefin to sulfur monohalide may range from about 1:1 up to 1.65:1 or more. However, there are indications that ratios in excess of 1.65:1 are likely to produce a darker product in smaller yield. In the case of isobutylene and sulfur monochloride, the optimum ratio appears to be between about 1.55:1 and 1.60:1.

Although anhydrous reaction conditions are generally regarded as providing better results, a small amount of water ranging up to about 10% of the weight of the sulfur halide may be present in the initial reaction; however it is usually preferred to keep the water content below about 4% on that basis. To avoid decomposing sulfur chloride, any such addition of water should be made either simultaneously with the introduction of the olefin into the reactor or subsequently.

The sulfohalogenation reaction is exothermic, evolving 500–650 b.t.u./lb. in the case of isobutylene, and cooling is necessary to prevent the temperature from exceeding about 140° F. with resultant darkening of the product and some decrease in the yield. The preferred range of reaction temperatures is from about 120 to 135° F. and a temperature of about 125° F. appears to be the optimum. Typical reaction times for the initial stage of the process range from about 1 to 15 hours.

The reaction pressure is not critical here and may be illustrated by pressures ranging from about 0 to 100 pounds per square inch gage pressure (p.s.i.g.) depending upon the reaction temperature and the volatility of the olefinic material.

The initial reaction is catalyzed with a lower aliphatic alcohol containing from 1 to 4 carbon atoms, as exemplified by methanol, ethanol, propanol and isopropanol. Of these, methanol and ethanol are usually preferred, especially the former, and amounts of the alcohol ranging from about 0.2 to 10% of the weight of the sulfur chloride may be utilized, but quantities of the order of 0.5 to 3% are usually preferred. While the catalytic alcohol may be introduced into the reactor in the liquid state, it is often more desirable to introduce it as a vapor.

Hydrogen chloride is evolved in the reaction and this gas is vented from the reactor. It may be recovered as hydrochloric acid in a water absorption system.

In an integrated refinery, aqueous caustic alkali solutions are widely employed in the liquid phase purification of a variety of hydrocarbon streams, and the spent aqueous liquors resulting from such operations may be classified as "inorganic caustics" and "organic caustics." The spent inorganic caustic solutions usually have a relatively low content of organic compounds and are generally obtained from treating liquid propane, butane, butylene, solvent naphthas and alkylation effluents for the removal of mercaptans, sulfuric acid and especially hydrogen sulfide. As for the spent organic caustic liquors issuing from the treatment of catalytic gasolines and heavier distillates, these aqueous solutions contain somewhat smaller amounts of the sulfide impurities but large proportions (e.g., over 25% by weight) of organic material chiefly in the form of aromatic derivatives, such as phenolic and thiophenolic compounds. Although potassium hydroxide is operative for such purification, sodium hydroxide solutions are invariably used for economy. After mixing all of the spent caustic solutions in a typical refinery, the approximate composition of the mixture may be exemplified as:

| | Weight percent |
|---|---|
| Sodium hydroxide | 6.1–6.3 |
| Sodium hydrosulfide | 4.9–5.4 |
| Sodium cresylates [1] | 14.6–20.4 |
| Sodium sulfate | 0.5–0.7 |
| Sodium chloride | 0.04–0.06 |
| Oil | 0.3–0.4 |
| Ferrous sulfide—(5–10 p.p.m.) | |
| Water | Balance |

[1] Sodium salts of cresols, thiocresols, phenol, thiophenol and the xylenols.

The largest component of the solute in these mixed spent solutions is the sodium cresylate mixture which is readily marketable after being recovered in the form of crude cresylic acids. The recovery can be accomplished economically by treating the caustic solution with the by-product or waste hydrogen sulfide from a catalytic hydrodesulfurization unit. This treatment springs the cresylate salts as an organic phase by conversion into cresylic acids, and it also converts the sodium sulfide and sodium hydroxide in an aqueous phase into sodium hydrosulfide. Upon standing, the mixture forms two layers with the upper layer varying in color from amber to black and containing the cresylic acids and other organic compounds while the bottom layer of aqueous sodium hydrosulfide solution separates cleanly as a milky white or colorless liquid which is drawn off for use in the present process. Thus, the hydrogen sulfide treatment not only separates valuable cresylic and thiocresylic compounds and disposes of unwanted hydrogen sulfide but also has the desirable effect of substantially increasing the sulfur content of the aqueous phase for use in the present process.

The hydrogen sulfide treatment is usually carried essentially to completion as indicated by a pH value of about 8.0–8.5 whereupon only a small content of organic compounds remain in the aqueous phase. However, in some instances, the $H_2S$ addition may be terminated earlier, for example, when the alkali metal hydrosulfide content reaches at least about 75% by weight of the dissolved alkali metal compounds. In the latter procedure, slightly more of the cresylic compounds are retained in the aqueous solution and also in the organic sulfide final product of this invention, and such retention may be desirable in view of the known antioxidant properties of alkylated phenolic compounds.

The aqueous phase derived from such treatment has a typical analysis by weight of:

| | |
|---|---|
| Sodium hydrosulfide | 16–24 |
| Sodium monosulfide | 0–4 |
| Sodium carbonate | 1–3 |
| Raw cresylic acids | 0.1–1.0 |
| Sodium sulfate | 0.7 |
| Sodium chloride | 0.05 |
| Water | Balance |

In preparing the sulfurizing reactant of the present invention, this solution is then treated with a stoichiometric amount of sodium hydroxide (i.e., one mole of NaOH per mole of NaHS) or up to about a 5% excess thereof which usually raises the pH to 10–10.5 in converting the sodium hydrosulfide to sodium monosulfide.

While it is usually preferable to employ an alkali metal sulfide reactant derived from a mixture of both the organic and inorganic types of spent caustic alkali solutions, substantial benefits according to the present invention are obtainable with a reactant prepared from spent caustic effluent of the inorganic type only. The same manner of preparation in the latter case except that there is seldom, if ever, any phase separation after the hydrogen sulfide treatment.

A lower aliphatic alcohol is added as a mutual solvent for the sulfurization-dechlorination reaction. Methanol, ethanol, propanol, butanol and isobutanol as well as mixtures thereof may be employed for the purpose, and isopropanol is preferred. Although a quantity of alcohol amounting to 10% of the weight of the sulfohalogenation adduct provides adequate solvent action in the reaction mixture, it has been discovered that surprising effects are obtained with larger proportions of the alcohol in the reaction mixture in that more alcohol up to a quantity of about 50% of the weight of the adduct not only provides an unexpected increase in the reaction rate but also a striking improvement in sharply reducing the content of undesired chlorine in the final product while increasing its sulfur content. Thus it is desirable to charge at least about 20% alcohol and the range of about 25 to 40% is preferred. While larger proportions of alcohol may provide some additional benefit, the cost of handling and recovering the extra alcohol also increases.

In sulfurizing and dechlorinating the sulfochlorination addition product, the aqueous alkali metal monosulfide solution is desirably present in at least a stoichiometric quantity, and preferably a slight excess, of available alkali metal monosulfide in order to remove essentially all of the combined chlorine from the adduct. In practice, the adduct or intermediate product from the sulfochlorination reaction is pumped into the solution of sodium monosulfide in water and the alcohol in an amount usually ranging from 2.52 to 2.70 pounds of adduct per pound of the sodium sulfide (anhydrous basis) in providing a slight excess of available sodium monosulfide.

In general, this treatment of the adduct may be carried out at temperatures between about 150 and 250° F. and the range between about 170 and 195° F. is usually preferred. The reaction pressure may be subatmospheric or elevated up to 50 or more p.s.i.g. For simplicity, it is usually preferable to carry out the reaction at reflux temperature of typically 175 to 18° F. under atmospheric pressure in a vessel equipped with a reflux condenser.

This second reaction is continued with occasional sampling of the reaction mixture until the organic phase that separates upon standing is found to have a suitably low content of combined chlorine usually below 0.5% by weight and often less than 0.2%. Typically this may require from about 1 to 3 hours under preferred conditions depending upon a number of factors including the reaction temperature and the proportion of isopropanol or other alcohol present in the reaction mixture, but longer reaction times may be employed if desired.

When the chlorine has been reduced to the selected level, the reaction mixture is allowed to stand and separate into a lower aqueous sodium chloride layer and an upper liquid layer containing the desired organic sulfide product. After the brine layer has been drained off, the liquid organic product is usually transferred to a wash vessel wherein it is washed one or more times with water and allowed to stand until the organic and aqueous layers separate whereupon the wash water is withdrawn and discarded. The washing and separation of liquid phases may be expedited by the introduction of a substantial quantity of an organic solvent, such as hexane, benzene or petroleum either. As indicated earlier, caustic alkali wash treatment is usually undesirable and seldom, if ever, necessary in the instant process for obtaining a product having a good copper corrosion strip rating and low chlorine content. The washed product is usually dried by heating at moderately elevated temperatures under subatmospheric pressure, and its clarity may often the improved by filtering the dried product through a bed of bauxite, clay or diatomaceous earth particles.

In addition to the advantages described earlier, other benefits are obtained by employing an alkali metal monosulfide reactant derives from spent aqueous caustic treating solutions of petroleum refinery origin, inasmuch as the organic sulfide product generally displays a higher combined sulfur content and is also less corrosive than the products obtainable by employing an aqueous solution of a commercial grade of either sodium monosulfide or sodium hydrosulfide in the sulfurizing-dechlorinating reaction. The cause of this unusual effect as well as certain other aforementioned advantages of the novel process is not understood at the present time; hence this invention should not be construed as dependent upon any particular theory of operation. Moreover, while the chemical composition of the final organic sulfide products of the instant process have not been fully ascertained, there is evidence that they contain a high proportion of —S—S— linkages, and such products do not corrode copper in contrast with products containing higher polysulfide linkages.

For a better understanding of the nature, objects and advantages of this invention, reference should be had to the following examples which are of an illustrative nature and not intended as limitations on the invention. Unless otherwise stated, all proportions are set forth in terms of weight and all temperatures as degrees Fahrenheit.

EXAMPLE 1

After purging the vessel with nitrogen, 2256 pounds of sulfur monochloride is pumped into a dry closed 1000-gallon stainless steel vessel equipped with an agitator and a pressure control valve as well as indirect heat exchange devices of rather limited capacity for controlling the reaction temperature. With the agitator rotating continually throughout the course of the reaction and the contents of the vessel maintained at 124–126° F., 1613 pounds of isobutylene is added over a period of 8 hours while 27 pounds of vaporized methanol is being introduced into the lower part of the reactor at a rate of 25–35 cc./minute to catalyze the sulfochlorination reaction. An exothermic reaction occurs, and despite the heat absorbed by vaporization of the isobutylene within the reactor, it is necessary to circulate cooling water at a high rate through the heat exchange devices to control the reaction temperature. On the basis of other experiments, it is evident that the time required for introduction and reaction of the olefin can be greatly reduced in equipment of greater cooling capacity. About 90 pounds of hydrogen chloride is evolved during this reaction and vented off through the pressure control valve to a scrubber. The resulting addition product is a liquid with a density of 1.175 g./mL., and the yield of 3775 pounds is indicative of an isobutylene take-up of 94%.

Meanwhile, in a similarly equipped vessel the sodium monosulfide solution is prepared for the second reaction of dehalogenating and sulfurizing the sulfochlorinated intermediate product by treating a refinery hydrosulfide solution with caustic soda. The hydrosulfide solution is the aqueous phase separated from an overall mixture of spent caustic soda solutions of the inorganic and organic types after treatment with hydrogen sulfide in the manner described hereinbefore, and the resulting aqueous solution contains 19.5 weight percent of sodium hydrosulfide and 1.1 percent of sodium monosulfide ($Na_2S$) as well as the minor amounts of other components mentioned earlier. Essentially all of the sodium hydrosulfide in 2070 pounds of this solution is converted into sodium monosulfide by adding 623 pounds of 50% aqueous sodium hydroxide solution.

Next, 644 pounds of isopropanol is added to the closed vessel with constant stirring and the temperature of the mixture is adjusted to 175° F. following which 1792 pounds of the sulfochlorination reaction product mixture is pumped into this solution over a period of one hour through a dip tube extending below the surface of the liquid while the temperature of the mixture is controlled at 185° F. to restrain the exotherm observed; steam is admitted to the jacket on the vessel to bring the reactant mixture to reflux temperature. To determine the progress of the reaction, samples are taken at 1, 2 and 6 hours after the start of refluxing; and the upper organic layer is analyzed with the following results:

| Time | Percent S | Percent Cl | Viscosity, centistokes |
|---|---|---|---|
| 1 hour | 48.6 | 0.72 | |
| 2 hours | 48.2 | 0.41 | 150–160 at 100° F. |
| 6 hours | 48.0 | 0.11 | 443 at 74° F. |

These data indicate that the reaction is essentially complete in only two hours and, on the basis of roughly comparable viscosity tests, that such a short reaction time is important in the production of low viscosity products in restricting the time and degree of polymerization reactions. After 6 hours, the reflux condenser is shut off while 479 pounds of isopropanol-water azeotrope are distilled overhead and condensed in an external condenser for subsequent reuse. Agitation is then suspended and the liquid mixture is allowed to separate into organic and aqueous layers for about 3 hours; then the bottom layer which is essentially a 20–25% solution of sodium chloride in water is drained off and stored in a slop tank for subsequent recovery of its small content of organic compounds. The organic material in the sulfurizing reactor is now mixed with 200 gallons of Udex raffinite (essentially a mixture of aliphatic hydrocarbons of 150–220° F. boiling range) for 1 hour at 130° F. to facilitate water washing by suppressing the formation of emulsions; and this is followed by washing in water at 140–150° F. for 1 hour. After draining off the wash water, the hydrocarbon mixture is distilled off and the product is dried under a vacuum of 10 inches Hg at 200° F. The dried product is filtered through a bed 1/10 inch bauxite particles to improve its clarity.

The yield of sulfurized organic product amounts to 1093 pounds or 98% of theory for this stage of the process. Observations and determinations show that this material has a sulfur content of 48% by weight and a chlorine content of only 0.11% as well as a clear, light orange-brown color, complete miscibility in oils and an unobjectionable odor. In addition, the product is found to have a maximum rating of 460+ pounds in the SAE Load Carrying Test at 1000 r.p.m. and a good copper strip corrosion rating as well as a high flash point of 250° F.

EXAMPLES 2–5

A smaller amount of a sulfochlorinated intermediate is prepared according to the procedure of Example 1 in laboratory equipment and split into four batches which are each subjected to a six hour sulfurization-dechlorination treatment as in Example 1 employing the same aqueous sodium monosulfide reactant solution but with varying quantities of isopropanol incorporated in the reaction mixture. Then the organic and aqueous brine layers are allowed to separate and the unwashed organic layer of each batch is analyzed for its chlorine and combined sulfur contents with the following findings.

| Example: | Isopropanol: adduct, wt. ratio | Organic sulfide product Percent Cl | Percent S |
|---|---|---|---|
| 1 | 0.36 | 0.11 | 48.0 |
| 2 | 0.16 | 3.85 | 43.0 |
| 3 | 0.25 | 1.90 | 44.9 |
| 4 | 0.37 | 0.75 | 44.8 |
| 5 | 0.49 | 0.40 | 45.5 |

Upon reviewing the analysis of Examples 2 to 5, inclusive, it is evident that increasing the proportion of isopropanol in the reaction mixture exerts very striking and beneficial effects both in greatly reducing the content of undesired chlorine and in boosting substantially the combined sulfur content of the product. Moreover, as mentioned earlier, increasing the concentration of isopropanol also greatly increases the reaction rate thereby enabling an improved product of lower viscosity to be manufactured with greater efficiency.

The final analysis of the product of Example 1 is included in the table for comparison with that of the generally similar Example 4 to demonstrate the superior results obtainable in larger scale operations.

EXAMPLE 6

The procedure of Example 1 is also followed in preparing a mixture of sulfurized organic compounds from a mixed butylene obtained from a petroleum refinery stream instead of the isobutylene, and the same reaction conditions and molar ratios of reactants are employed unless otherwise specified. Ignoring its small content of water, the predominantly olefinic mixture employed in this instance has the following composition by weight:

| Component: | Wt. percent |
|---|---|
| Propane | 1.0 |
| Propylene | 0.2 |
| n-Butane | 3.4 |
| Isobutane | 21.4 |
| Butene-1 | 11.8 |
| Isobutylene | 58.3 |
| Trans-2-butene | 3.2 |
| Cis-2-butene | 0.2 |
| Butadiene | 0.2 |
| Methyl acetylene—(420 p.p.m.). | |
| Other hydrocarbons | 0.3 |
| | 100.0 |

The saturated hydrocarbons in the charge are not reactive, and they are eliminated from the reaction mixture by vaporization during the process. In the second reaction (sulfurization-dechlorination), the isopropanol in the reactor amounts to 38% of the weight of the adduct and the mixture is maintained at the 180° F. reaction temperature for two hours. After separating the two liquid phases of the reaction products, the organic phase is washed at moderately elevated temperatures with a 5% aqueous sodium hydroxide solution prior to the water washing operation described earlier.

The product obtained by reacting the tabulated hydrocarbon mixture is more complex than that obtained with the isobutylene reactant; however its properties resemble those of the product of Example 1 as evidenced by the following physical and chemical characteristics:

Sulfur content—46.5%
Chlorine content—0.47%
Cu strip corrosion rating—2A
SAE Load Rating (1000 r.p.m.)—460+lbs.
Viscosity—211 cs./100° F.

While the product of this example has a somewhat darker color than that of Example 1, it is also less expensive since the mixed butylenes stream available in petroleum refineries is of less value than the relatively pure isobutylene employed in the previous example. Moreover, there is some reason to believe that the sulfurized butene-1 component enhances the resistance of the product mixture to oxidation.

While the process of the present invention has been described in detail in conjunction with the treatment of a limited number of reactants under similar conditions for the purposes of valid comparisons and of fully illustrating this invention, it will be readily apparent to those skilled in the art that numerous modifications and variations of the process relative to specific reactants, and reaction conditions are within the purview of this invention. Accordingly, the present invention should not be construed as limited in any particulars except as may be set forth in the appended claims or required by the prior art.

What is claimed is:

1. A process which comprises sulfohalogenating a hydrocarbon olefin having a single double bond and having from about 2 to about 8 carbon atoms per molecule with a sulfur halide selected from the group consisting of sulfur chlorides and sulfur bromides in the presence of a catalytic quantity of a lower aliphatic alcohol to form a sulfohalogenated organic intermediate, and thereafter sulfurizing and dehalogenating said intermediate in the presence of a substantial quantity of a lower aliphatic alcohol by treatment with an aqueous alkali metal monosulfide solution derived from a spent aqueous alkali metal hydroxide effluent from hydrocarbon purification, the effluent comprising from about 6.1 to about 6.3% by weight of sodium hydroxide, from about 4.9 to about 5.4% by weight of sodium hydrosulfide, from about 14.6 to about 20.4% by weight of sodium cresylates and less than 1% by weight of each of sodium sulfate, sodium chloride, oil and ferrous sulfide, the remainder of said effluent being water.

2. A process according to claim 1 in which said alkali metal monosulfide solution is prepared by treating said spent effluent with sufficient hydrogen sulfide to provide a solution wherein an alkali metal hydrosulfide amounts to at least about 75% by weight of the dissolved alkali metal compounds, and thereafter reacting said hydrosulfide with at least about a stoichiometric quantity the hydroxide of said alkali metal to convert substantially all of said hydrosulfide to the alkali metal monosulfide.

3. A process according to claim 2 in which said spent effluent containing a substantial proportion of organic compounds is split into an organic liquid phase and an aqueous phase by said hydrogen sulfide treatment, said phases are separated and said aqueous phase is reacted with said alkali metal hydroxide.

4. A process according to claim 2 in which said alkali metal is sodium and said sulfur halide is a sulfur chloride.

5. A process according to claim 1 in which methanol is present in said sulfohalogenation reaction and isopropanol is present in said sulfurizing reaction.

6. A process according to claim 5 in which said methanol amounts to between about 0.2 and 10% of the weight of said sulfur halide and said isopropanol amounts to at least about 25% of the weight of said intermediate.

7. A process according to claim 1 in which the charge to said sulfohalogenation reaction contains less than 10% water based on the weight of said sulfur halide.

8. A process according to claim 1 in which said olefin contains from 3 to 6 carbon atoms per molecule, and the final organic sulfide product has a content of combined sulfur in excess of about 44% by weight.

9. A process according to claim 1 in which said olefin comprises at least a major proportion of isobutylene, and the final organic sulfide product has a content of combined sulfur in excess of 45% by weight.

10. A process according to claim 1 in which said sulfur halide is sulfur monochloride.

11. A process according to claim 10 in which the molar ratio of said olefin to said sulfur monochloride is between about 1:1 and 1.65:1.

12. A process according to claim 10 in which the molar ratio of said olefin to said sulfur monochloride is between about 1.55:1 and 1.60:1.

13. A process according to claim 1 in which the temperature of said sulfohalogenation reaction is between about 120 and 140° F. and the temperature of said sulfurizing reaction is between about 170 and 195° F.

14. A process according to claim 13 in which said sulfohalogenation reaction temperature is at least partially controlled by the introduction of a volatile olefin in the liquid state and vaporization thereof during said sulfohalogenation reaction.

References Cited
UNITED STATES PATENTS

| | | | |
|---|---|---|---|
| 3,068,218 | 12/1962 | Beretvas et al. | 260—139 |
| 2,708,199 | 5/1955 | Eby | 260—139 X |
| 2,249,312 | 7/1941 | Kimball | 260—139 |

LEWIS GOTTS, Primary Examiner

D. R. PHILLIPS, Assistant Examiner